(12) United States Patent
Kautto et al.

(10) Patent No.: US 6,332,385 B1
(45) Date of Patent: Dec. 25, 2001

(54) METHOD OF TURNING A ROTATING METALLIC WORKPIECE

(75) Inventors: Eilert Kautto, Söderbärke (SE); Norbert König, Leverkusen (DE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 09/396,467

(22) Filed: Sep. 15, 1999

(51) Int. Cl.⁷ .............. B23B 1/00; B23B 29/00
(52) U.S. Cl. .............. 82/1.11; 82/47; 407/107; 407/119
(58) Field of Search .............. 82/1.11, 47; 407/119, 407/120, 107, 104, 103

(56) References Cited

U.S. PATENT DOCUMENTS

| 4,890,782 | * | 1/1990 | Nakai et al. ............. 228/112 |
| 5,129,767 | * | 7/1992 | Satran et al. ............. 407/40 |
| 5,246,315 | * | 9/1993 | Hansson et al. ............. 407/114 |
| 5,256,008 | * | 10/1993 | Hansson et al. ............. 407/33 |
| 5,503,913 | * | 4/1996 | Konig et al. ............. 428/216 |
| 5,722,803 | * | 3/1998 | Battaglia et al. ............. 407/119 |
| 5,876,160 | * | 3/1999 | Johnson ............. 409/132 |

* cited by examiner

*Primary Examiner*—Henry Tsai
(74) *Attorney, Agent, or Firm*—Burns, Doane, Swecker & Mathis, L.L.P.

(57) ABSTRACT

A rotating metallic workpiece, the hardness of which lies within the interval of 45–65 HRC, is turned by a cutting insert while being rotated about an axis. The insert has a cutting edge made of cubic boron nitride. The cutting insert is fed in a feed direction into the rotating workpiece, by a distance which is shorter than an effective cutting edge length in order to cut a surface having a finish Ra of maximum 0.2 μm. The ends of the cutting edge are situated outside the zone of contact with the workpiece.

6 Claims, 2 Drawing Sheets

METHOD OF TURNING A ROTATING METALLIC WORKPIECE

BACKGROUND OF THE INVENTION

The present invention relates to a method of turning a rotating metallic workpiece.

PRIOR ART

Polycrystalline cubic boron nitride (PCBN), is next to diamond, the hardest material. PCBN is, contrary to diamond, stable at high temperatures, which means that the turning of hardened components, such as hardened steel having a hardness of 45–65 HRC, becomes possible also with economically advantageous cutting characteristics. This is utilized within today's modern machining industry by turning the hardened components that earlier used to be ground. Efficient CNC lathes enable quick and flexible machining to an equivalent quality as with grinding in the sense of surface roughness and tolerances but at a lower cost and with shorter machining times. Martensitic transformations, so called white layers, just as residual strains in the machined surface, can occur during both grinding and hard turning. These phenomena depend on the generation of heat and the mechanical strain in the cutting process and they are influenced by cutting characteristics, tool shape as well as the choice of tool paths.

The hard turning methods currently used for machining try to have as little contact between the cutting insert and workpiece surface as possible in order to meet the quality requirements for the finished component. This means that machining is made with small cutting depth and feed and relatively pointed cutting corners. The cutting corner, which is in little engagement, is brought from the beginning of the machined surface to its end, by using typical cutting characteristics in the order of cutting depth ap=0.1 mm, feed f=0.1 mm/r and cutting speed =150 m/min.

OBJECTS OF THE INVENTION

One object of the present invention is to provide a method for hard turning, which obtains the advantages of the prior art.

Another object of the present invention is to provide a method for hard turning in order to drastically reduce the machining time for the fine turning of hardened components.

Another object of the present invention is to provide a method for hard turning in order to improve the surface quality during the fine turning of hardened components.

Another object of the present invention is to provide a method for hard turning in order to minimize the existence of white layers and residual strains in the machined surface.

SUMMARY OF THE INVENTION

The invention pertains to a method of turning a metallic workpiece having a hardness in the range of 45–65 HRC, to generate a surface having a surface finish Ra no greater than 0.2 $\mu$m, the method comprising the steps of:

A. mounting a cutting insert in a toolholder, the cutting insert comprising a cutting edge formed of cubic boron nitride; and B. establishing relative movement between the insert and the workpiece in a feed direction, whereby the insert engages the workpiece and cuts in the feed direction for a distance which is shorter than an effective length of the cutting edge oriented perpendicular to the feed direction, the cutting edge including opposite ends disposed out of contact with the workpiece during the feeding of the insert.

BRIEF DESCRIPTION OF THE DRAWING

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS OF THE INVENTION

Figure 1:
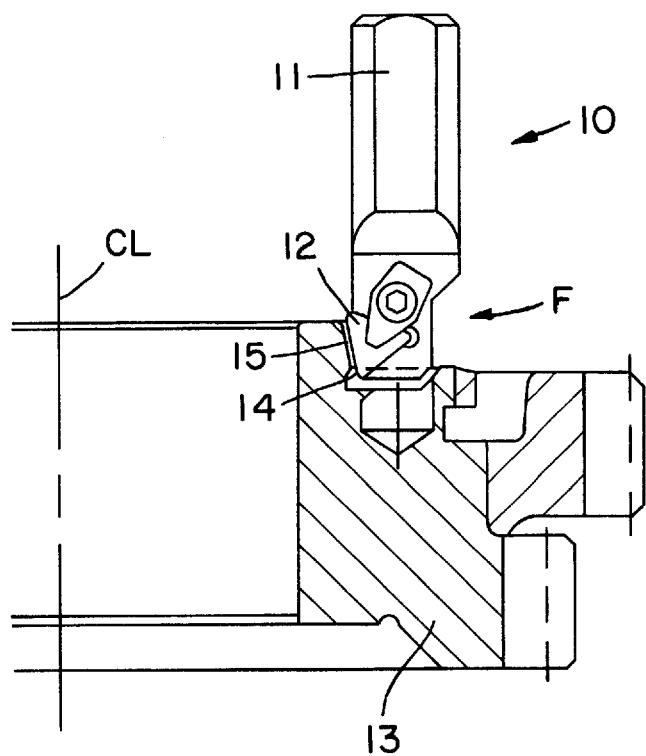
FIG. 1 is a view of a cutting insert approaching a workpiece in accordance with a first embodiment of the invention.
Figure 1A:
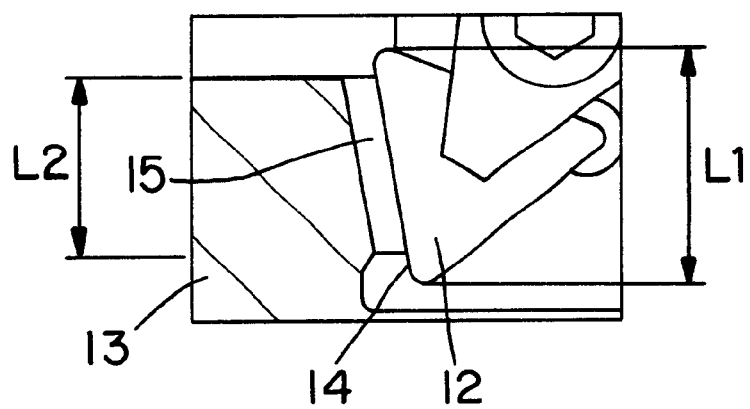
FIG. 1A is an exploded fragmentary view of FIG. 1.

In FIGS. 1 and 1A a turning tool 10 is shown comprising a cutting insert holder 11 and a cutting insert 12 mounted therein. The cutting insert (or at least a portion thereof forming the cutting edge) is made of a material (e.g., PCBN) which is harder than 1500 HV1 (i.e., Vickers hardness at a load 1 kg). Thus, the material of the cutting insert is harder than cemented carbide. By "cemented carbide" is here meant WC, TiC, TaC, NbC, etc. in combination with a binder metal such as for example Co or Ni. The cutting insert in FIGS. 1 and 1A has a triangular basic shape with three cutting edges 14. Each cutting edge 14 is located between two adjacent cutting corners of the insert and has an effective cutting edge length L1, which is the length of the cutting edge measured in a direction perpendicular to the feed direction F. If the cutting edge extended perpendicular to the feed direction, then such effective length would be the actual length of the cutting edge. In FIGS. 1, 1A, however, the cutting edge is oriented obliquely to the feed direction. The insert is shaped so that the cutting edge has the same profile as the finished surface 15 of the finished component 13. Thus, the machining occurs much faster since all of the cutting edge profile comes into engagement simultaneously and the feed occurs in a direction opposite to the prior art feed. The cutting insert is consequently fed in only one direction F by a distance that is shorter than the effective cutting edge length L1. The finished surface 15 of the component 13 has a length L2 perpendicular to the feed direction F. The cutting edge length L1 is always greater than the length L2 of the zone of contact such that the ends of the active cutting edge 14 during turning are outside the zone of contact with the workpiece 13. Thereby, a surface roughness Ra is obtained which is maximum 0.2 $\mu$m.

Tests have shown that with the method according to the present invention the time for machining can be reduced to a tenth of the time when using the conventional hard turning method. Completely surprising it has been shown that the existence of white layers is reduced and that it seems that as the level of tension also becomes less.

EXAMPLE 1

Machining of an external guiding surface 15 of a cogwheel 13, with hardness 59 HRC, for a gearbox according to FIGS. 1 and 1A.

Conventional Method:

a. Rough turning with a cutting insert of a neutral rhombic type with vc=130 m/min, f=0.16 mm/r, ap=0.1 mm, there vc is the cutting speed, f is the feed speed and ap is the cutting depth.

b. Fine turning according to above but with f=0.06 mm/r, ap=0.05 mm gave a surface finish Ra of 0.3 µm with a surface quality typical for conventional turning, that is a fully visible helical ridge on the generated surface with the partition 0.06 mm.

The Method According to the Present Invention:

Machining with a triangular cutting insert 12 with 80% of the cutting insert edge L1 in engagement and vc=200 m/min, f=0.05 mm/r, where the parameter "cutting depth" is missing, gave a surface finish Ra of 0.2 µm during feed in the direction F which is non-oblique relative to the axis of rotation CL, e.g., the feed direction F is perpendicular to the rotational axis CL of the workpiece. By the cutting depth being "missing" is here meant that cutting depth is not a parameter in the method of the present invention. Savings in time compared to the conventional turning became about 60% and the turning gave a completely bright generated surface.

Figure 2:
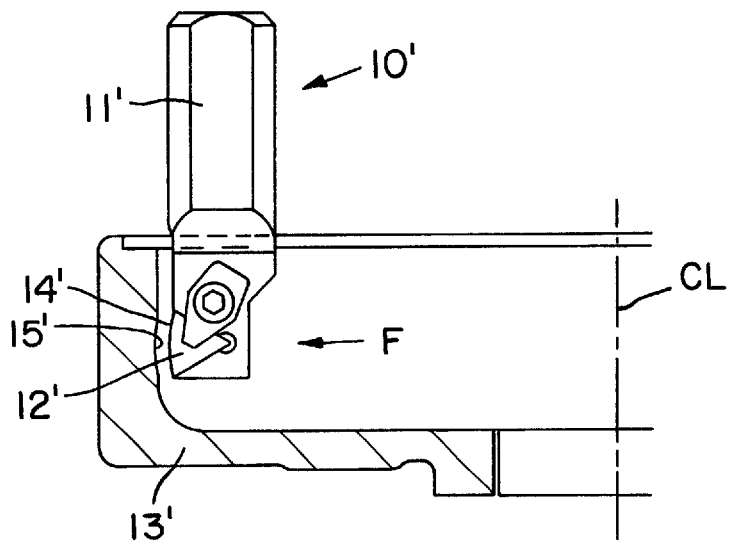
FIG. 2 is a view similar to FIG. 1 of a second embodiment of the invention.
Figure 2A:
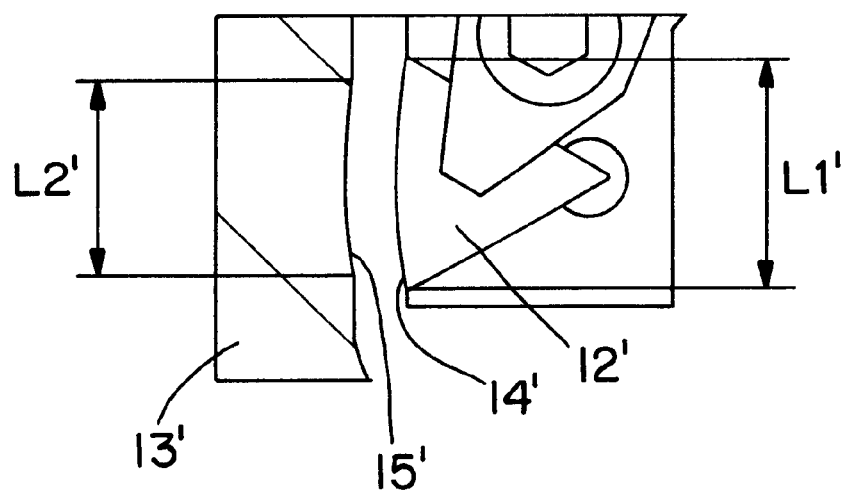
FIG. 2A is an enlarged fragmentary view of FIG. 2.

An alternative embodiment of a turning tool 10' is shown in FIGS. 2 and 2A, comprising a cutting insert holder 11' and a profiled insert 12' mounted therein. The hardness of the cutting insert 12' relative to the hardness of the workpiece 13' is the same as has been discussed above in connection with FIGS. 1 and 1A. The cutting insert 12' has a triangular basic shape but with at least one convex cutting edge. The effective cutting edge length L1', which, like the earlier-discussed effective length L, is defined by the maximum available insert edge 14' length measured perpendicular to the feed direction, is always greater than the length L2' of the zone of contact such that the ends of the active cutting edge 14' during turning are outside the zone of contact with the workpiece 13'.

EXAMPLE 2

Machining of an internal bearing race 15' of a ball bearing ring 13', with a hardness 58 HRC, according to FIGS. 2 and 2A.

Conventional Method:

a. Rough turning with a cutting insert of a positive triangular type with vc=150 m/min, f=0.1 mm/r, ap=0.15 mm.

b. Fine turning according to above but with vc=180 m/min, ap=0.05 mm gave the surface finish Ra of 0.3 µm with a surface quality typical for conventional turning, that is a fully visible screw-shaped ridge on the generated surface with the partition of 0.1 mm.

The method According to the Present Invention:

The generation of finished surface with the profiled insert 12' with vc=400 m/min, f=0.02 mm/r, where the parameter "cutting depth" is missing, gave the surface finish Ra of 0.2 µm at a feed whose direction F is perpendicular to the rotational axis CL of the workpiece. Time savings compared to conventional turning became 50–90% depending on the size of the component. The internal bearing race 15' of the ball bearing ring 13' obtained a wholly bright generated surface with the method according to the present invention, which improves the fatigue strength for the bearing race and which reduces resistance against rolling in the bearing.

With the method according to the present invention subsequent honing and polishing operations can be avoided in most cases.

The present invention consequently relates to a method for turning of a rotating metallic workpiece where cutting depth is missing, wherein the machining time at fine turning of hardened components is drastically reduced and the existence of white layers and tensions in the finished surface is reduced.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A method of turning a metallic workpiece the method comprising the steps of:

A) mounting a cutting insert in a toolholder, the cutting insert comprising a cutting edge formed of cubic boron nitride;

B) rotating a workpiece having a hardness in the range 45–65 HRC about an axis; and C) establishing relative movement between the insert and the workpiece in a direction of feed, whereby the insert engages the workpiece and cuts for a distance which is shorter than an effective length of the cutting edge measured in a direction perpendicular to the feed direction, the cutting edge including opposite ends disposed out of contact with the workpiece during the feeding of the insert, such that a surface of the workpiece having a surface finish Ra no greater than 0.2 µm is generated.

2. The method according to claim 1 wherein at least 80% of the effective length of the cutting edge engages the workpiece.

3. The method according to claim 1 wherein the direction of feed extends non-obliquely relative to an axis of rotation of the workpiece.

4. The method according to claim 3 wherein the direction of feed is perpendicular to the axis of rotation.

5. The method according to claim 1 wherein the cutting edge is straight and oriented obliquely relative to the direction of feed.

6. The method according to claim 1 wherein the cutting edge is convexly curved.

* * * * *